Dec. 18, 1928.
T. J. POWER
1,695,820
FORCED VENTILATION SYSTEM
Filed June 29, 1925
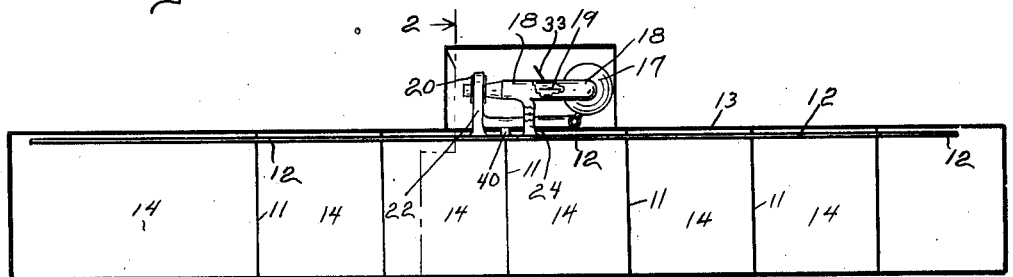
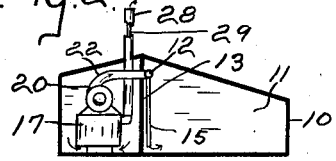
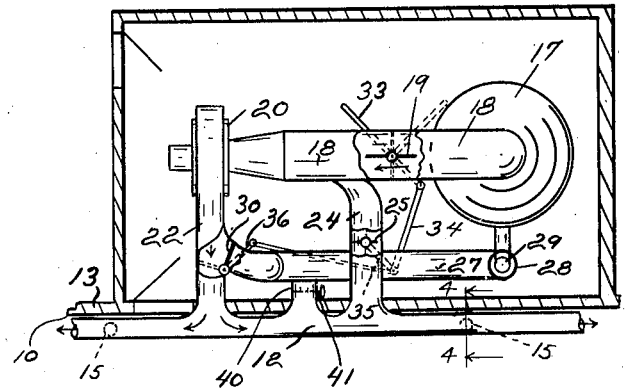
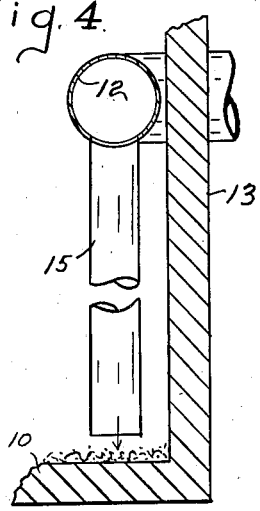
INVENTOR.
Thomas Joseph Power
BY
Erwin, Wheeler & Woolard
ATTORNEYS Patented Dec. 18, 1928.

1,695,820

UNITED STATES PATENT OFFICE.

THOMAS JOSEPH POWER, OF MILWAUKEE, WISCONSIN.

FORCED-VENTILATION SYSTEM.

Application filed June 29, 1925. Serial No. 40,233.

My invention relates to improvements in a forced ventilation system with particular reference to the ventilation of chicken coops and pens for domestic animals.

Objects of this invention are to provide a ventilating system which may be operated either under natural draft or under power and which may be used alternately for the purpose of causing a circulation of air through the apartment or apartments, for drying the apartment or apartments with particular reference to the drying of litter covered floors.

In the operation of the ventilating system as used for ventilating rooms occupied by fowls and other domestic animals the floor will, in nearly all cases, be relatively cold and have no means for heating the ground or the space underneath such floors. For this reason moisture tends to precipitate from the atmosphere to the floor and where the floors are covered with litter the moisture is absorbed thereby and the entire floor area including the litter thereon becomes damp and "soggy" in so short a time that it is not possible to keep the litter covering on the floor in a dry sanitary condition even though the litter covering be frequently replaced. It is, therefore, an object of my invention to provide means whereby warm air may be circulated through the apartment or apartments for ordinary ventilating purposes followed by a reversal of the air current in such a manner as to cause warm air to pass downwardly and along the floor to outlets through which the air is being withdrawn. The variations in pressure and in the direction taken by the air currents are beneficial and the floors and the material thereon may be kept perfectly dry without an undue expenditure of power.

In the drawings:—

Figure 1 is a plan view of an apartment coop to which my improved ventilating system has been applied, the roof of the coop and the heating chamber being removed.

Figure 2 is a sectional view drawn to line 2—2 of Figure 1.

Figure 3 is a plan view of the heater and a portion of the pipe connections on an enlarged scale, the heating chamber being shown in horizontal section.

Figure 4 is a sectional view drawn on line 4—4 of Figure 3.

Like parts are identified by the same reference characters throughout the several views.

The building 10 to be ventilated by my improved system is illustrated as an elongated rectangular building such as is commonly used for the housing of poultry, the same having transverse partitions 11 at suitable intervals. A ventilating main 12 extends along one side wall 13 of the building near the top thereof and within the respective apartments or spaces 14 between the partitions 11, a series of downwardly extending ventilating ducts 15 are provided, at least one such duct being provided for each apartment.

The heater may be assumed to comprise an ordinary hot air furnace in which a suitable stove is enclosed by a hood 17 whereby air to be heated may be circulated through the space between the hood and the stove. Such heaters being in common use, further description or detailed illustration is deemed unnecessary.

The heater hood 17, however, is provided with a single opening preferably at the center of its top through which the heated air is delivered through a horizontally extending duct 18 having a controlling valve 19. The duct leads to a rotary fan or air forcing device 20 which may be assumed to be constructed substantially as disclosed in Letters Patent of the United States No. 798,699 dated Sept. 5, 1905. The air forcing device described in said Letters Patent is particularly adapted for my purposes because of the fact that it causes the development of a cyclonic whirl in the air taken in at the inlet which facilitates delivery of warm air into the atmosphere exterior to the building at times when such exterior atmosphere is at a very much lower temperature. When my improved system is being employed for ventilating purposes only, this warm air may be drawn through the furnace hood 17 into the casing of the air forcing device 20 and delivered therefrom through the duct 22 into the ventilating main 12 and downwardly through the various ducts 15 into the apartments. The air may be permitted to escape from the apartments through the crevices such as are always found around the doors and windows.

But it will be observed that the ventilating main 12 is connected directly with the duct 18 by a duct 24 having a valve 25 therein. Also the duct 22 is connected by an auxiliary duct 27 with a ventilating stack 28 which preferably encircles the smoke stack 29 of the heater. The duct 27 is provided with a gate valve 30 which in one position shuts off the flow of air through duct 22 to the main 12 and opens communication between the duct 22 and duct 27. In another position, this valve 30 closes duct 27 and allows free communication through the duct 22 with the main 12. The valve 19 is preferably operated by a lever 33. This lever is connected by a link 34 with a valve operating lever 35 secured to the stem of the valve 25. The lever 35 is connected in turn with a handle 36 for operating the gate valve 30. The arrangement is such that when valve 19 is open, valve 25 will be closed and gate valve 30 will be in a position to close the flow of air from duct 22 into duct 27. In this position the valves of the ventilating system will operate in substantially the ordinary manner as above described.

But when it is desired to dry the floors of the several apartments, lever 33 will be actuated to close valve 19 and temporarily shut off the heater from the several apartments. By so doing valve 25 will be opened and the gate valve 30 will cut off communication from duct 22 to the main 12. A continued operation of the fan or air forcing device 20 will then draw air from the floors of the several apartments upwardly through the ducts 15 into the main 12 and from the main 12 through the duct 24 and the outer end of the duct 18 to the inlet of the fan and it will then be ejected through a portion of the duct 22, the duct 27 and stack 28.

While the air from the several apartments is thus being ejected from the stack 28 the air in the vicinity of the floor being colder than that above, it will be drawn toward the lower ends of the ducts 15 which are then operating as suction ducts. As this air is withdrawn and the pressure within the apartments diminished the air within each apartment will flow downwardly toward the floor and absorb the moisture while passing to the ducts 15. Rapid drying of the lower portions of the apartment will result.

Some air will enter from the exterior around the doors and windows while the pressure in the several apartments is reduced during the drying operation. However, the apartments can be dried before sufficient air enters to seriously chill them or interfere with the drying operation. And as soon as the apartments have been sufficiently dried the position of the several valves will be reversed by means of lever 33 and normal ventilation resumed.

I have found that better results are attained by the system above described than can be obtained by providing a separate system of outlet pipes leading from the lower portions of the apartments through the roof of the building. I have also found that ventilation can be secured at less cost than otherwise inasmuch as it is merely necessary to force a small quantity of air through each apartment for normal ventilation, the intermittent drying operations being effective to withdraw the foul air in such a manner that the air supply is much more nearly completely renewed at the end of the drying operation than at the end of any corresponding interval in the operation of an ordinary ventilating system.

I have also found that by ejecting the foul air through the stack 28 the heat imparted to this air from the products of combustion in the pipe 29 will materially aid the fan and by using in this manner the type of fan above described I am able to eject air from the apartments at very small cost. It is also possible to ventilate the apartments by natural draft when conditions for such ventilations are favorable. Under such conditions the power may be shut off and a direct connection made from the main 12 to the duct 27 and stack 28 through the cross pipe 40. This pipe has a manually operable valve 41 which will be closed when the ventilating system is being operated under power.

I claim:

1. A ventilating system adapted for alternately delivering air into an apartment and withdrawing it therefrom, comprising the combination of an air forcing device having valved inlet and outlet ducts, a branch duct connected with said outlet duct, a main duct also connected with the outlet duct and a valved cross connection between the main duct and the inlet duct.

2. A ventilating system adapted for alternately delivering air into an apartment and withdrawing it therefrom, comprising the combination of a heater, an air forcing device having valved inlet and outlet ducts, a branch duct connected with said outlet duct, a main duct also connected with the outlet duct and a valved cross connection between the main duct and the inlet duct, said inlet duct being connected with said heater and all of said valves being interconnected for simultaneous operation to open the outlet duct in one of two directions and to close or open the cross connection simultaneously with the opening or closing of a portion of the inlet duct between the heater and said cross connection.

3. A heating and ventilating system comprising the combination with a heater, a main air conveying duct, connections between the heater and the main air conveyor duct, an air motor for advancing the air through said connections, a branch connection leading from the first mentioned connections to the exterior atmosphere, a valve adapted in one position to cut off the flow of air to the main and direct it through said branch duct and in another position to cut off the flow of air through the branch duct and deliver it to the main.

4. A heating and ventilating system comprising the combination with a heater, a main air conveying duct, connections between the heater and the main air conveyor duct, an air motor for advancing the air through said connections, a branch connection leading from the first mentioned connections to the exterior atmosphere, a valve adapted in one position to cut off the flow of air through the main and direct it through said branch duct and in another position to cut off the flow of air through the branch duct and deliver it to the main, said heater having a smoke stack and said branch duct having a delivery stack encircling the smoke stack.

5. A heating and ventilating system having in combination a heater provided with an air outlet duct, a main provided with branch air delivery ducts, a pair of cross connections between the heater duct and the main, a motor adapted to draw air from the heater duct and deliver it to the main through one of said cross connections, said other cross connection being adapted to allow a flow of air from the main to the motor, and valves in said cross connections controlling communication through each of them with the motor.

6. A heating and ventilating system comprising the combination with a jacketed heater, a main air ventilating duct, a connection between the heater jacket and the main ventilating duct, a smoke stack for the heater, an air outlet stack encircling the smoke stack and an auxiliary air duct leading from said connection to the air outlet stack.

7. A heating and ventilating system comprising the combination with a jacketed heater, a main air ventilating duct, a connection between the heater jacket and the main ventilating duct, a smoke stack for the heater, an air outlet stack encircling the smoke stack, an auxiliary air duct leading from said connection to the air outlet stack, and a valve adapted in one position of adjustment to direct air from the heater into the main ventilating duct while cutting off the flow of air to said stack and in another position to direct the air to said stack while cutting off its delivery to said main duct.

8. In a heating and ventilating system the combination with a main duct of an air motor provided with inlet and outlet ducts, connections between the main and the inlet and outlet ducts of the motor and a branch connection leading from the motor outlet duct to the exterior atmosphere, valves controlling the flow of air through said ducts and means for operating said valves to direct air from the motor into the main or to utilize the motor to withdraw air therefrom.

9. In a heating and ventilating system the combination with a main duct of an air motor provided with inlet and outlet ducts, connections between the main and the inlet and outlet ducts of the motor and a branch connection leading from the motor outlet duct to the exterior atmosphere, valves controlling the flow of air through said ducts and means for operating said valves to direct air from the motor into the main or to utilize the motor to withdraw air therefrom, said main being provided with branches having openings adjacent to the floor of the space to be ventilated.

10. In a heating and ventilating system, the combination of an air heater provided with a duct for hot air delivery to the chamber to be heated and ventilated, said duct having a branch connection leading to the external atmosphere, motor operable means for accelerating the flow of air through said duct, located between the heater and said branch connection, a by-pass duct connecting portions of the first mentioned duct independently of the accelerating means and branch outlet duct, and inter-connected valve mechanism adapted in one position to direct air from the heater through the accelerating means and first mentioned duct and in another position to cut off communication with the heater and direct air from the outlet portion of the first mentioned duct through the by-pass, the accelerating means and outlet duct.

11. In a heating and ventilating system, the combination of an air heater provided with a duct for hot air delivery to the chamber to be heated and ventilated, said duct having a branch connection leading to the external atmosphere, motor operable means for accelerating the flow of air through said duct, located between the heater and said branch connection, a by-pass duct connecting portions of the first mentioned duct independently of the accelerating means and branch outlet duct, and inter-connected valve mechanism adapted in one position to direct air from the heater through the accelerating means and first mentioned duct and in another position to cut off communication with the heater and direct air from the outlet portion of the first mentioned duct through the by-pass, the accelerating means and outlet duct, together with another by-pass connecting the outlet portion of the first mentioned duct with said branch outlet duct beyond the valve mechanisms and in a position to permit gravity circulation when the valves are in one position of adjustment.

THOMAS JOSEPH POWER.